Dec. 3, 1946. J. J. MOYNIHAN 2,412,094
SIGNAL DEVICE
Filed April 1, 1942
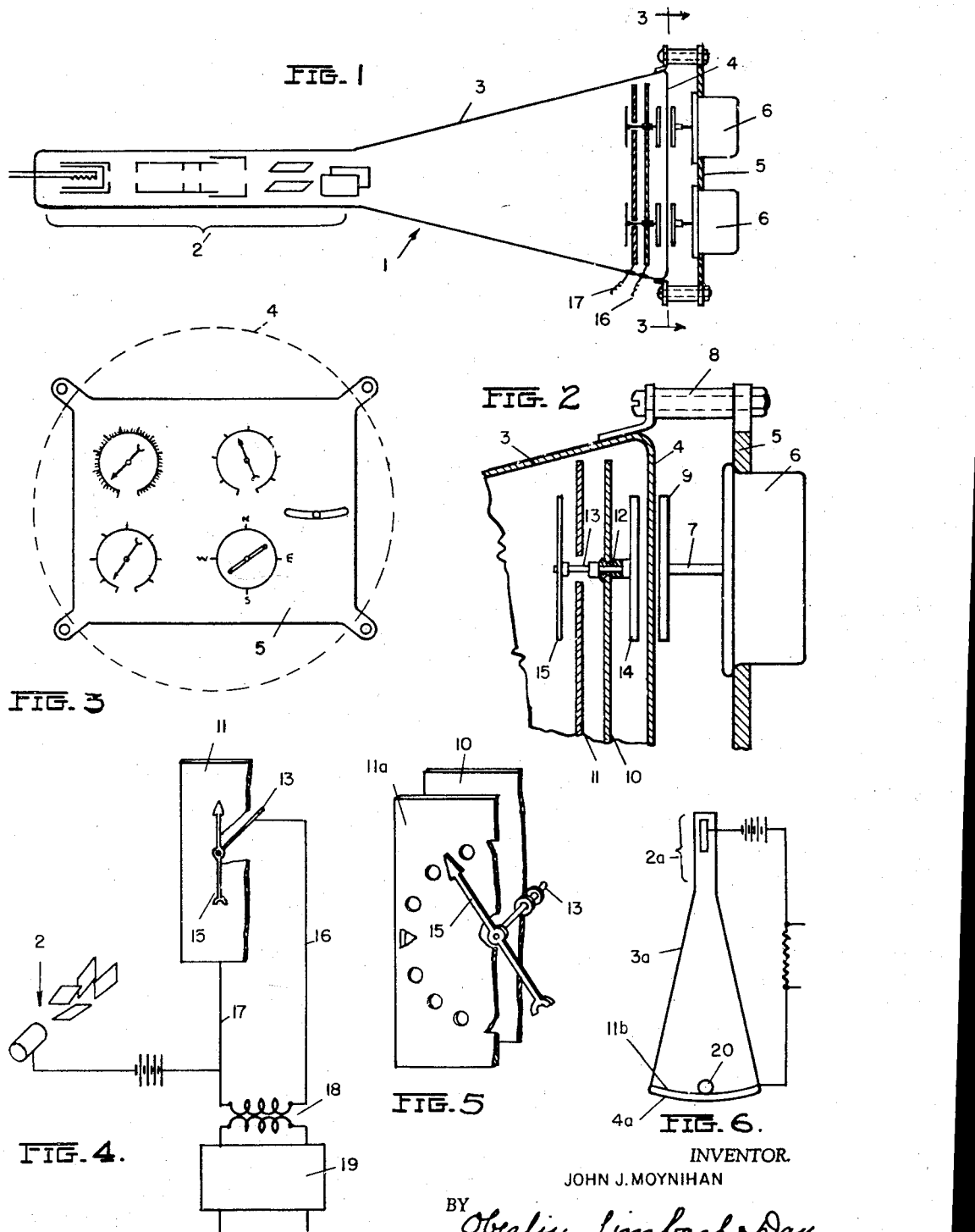
INVENTOR.
JOHN J. MOYNIHAN
BY Oberlin, Limbach & Day.
ATTORNEYS Patented Dec. 3, 1946

2,412,094

UNITED STATES PATENT OFFICE 2,412,094

SIGNAL DEVICE

John J. Moynihan, Rochester, N. Y., assignor of one-half to Joseph B. Brennan, Cleveland, Ohio Application April 1, 1942, Serial No. 437,252

7 Claims. (Cl. 177—351)

This invention relates, as indicated, to signal devices, and more particularly to a method of and apparatus for the transmission, to a remote point, certain signals and signal information so that the transmitted data may be in conveniently observable and intelligible form.

This invention relates particularly to methods of and apparatus of the character described in which the remote station to which the information is to be transmitted is most conveniently coupled to the station of original information by means of a radio link.

My invention is particularly applicable for the purpose of transmitting to a remote station an indication of the present state of one or more meters such as are usually provided with a cursor, the relative position of which is indicative of the information to be derived from the particular instrument or meter. From the description which ensues it will be readily apparent that my invention is capable of a wide variety of application such as, for example, when it is desired to determine at a remote point the present state of one or more instruments, gauges, or similar indicating devices. In one specific embodiment of my invention the same may be utilized for the purpose of determining at a remote point the present or instant condition of a plurality of pressure gauges, temperature indicating devices, and the like, such as, for example, are provided with cursors, the position of which is indicative of the variable condition continuously reflected by the specific instrument or gauge.

Another field of utility of my invention is in determining at a remote station such as may be conveniently located on the ground, the condition of a plurality of instruments such as occur on the instrument panel of an airplane in flight. By the use of my invention an operator at a ground station may have before him a substantial duplicate or replica of the faces of the instruments, or at least certain of them, on the instrument panel of an airplane in flight with the cursors of the instruments thus located at the ground station at all times coinciding with their counterparts in the actual instruments on the plane itself.

Heretofore it has been proposed to accomplish this result by utilizing television equipment for this purpose, and particularly by the employment of an ordinary image pick-up tube focused on the instrument panel of the signal generating equipment and a viewing tube at the remote station on which the image of the pick-up tube is reconstructed. The optical and electrical apparatus associated with such system is of course usually quite fragile and is therefore entirely unsuited for most purposes for which equipment of this character is required.

It is a principal object of my invention to provide a method of and apparatus for producing effectively similar results with apparatus of a much less expensive and much more rugged nature.

Other objects of my invention will appear as the description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:

Fig. 1 is a transverse sectional view of a cathode ray tube constructed in accordance with the principles of my invention and forming an element of the apparatus of my invention;

Fig. 2 is a sectional view of a portion of the structure illustrated in Fig. 1 drawn to an enlarged scale for clarity of illustration;

Fig. 3 is a transverse sectional view of the structure illustrated in Fig. 1 taken on a plane substantially indicated by the line 3—3;

Fig. 4 is a schematic diagram illustrative of a portion of the apparatus of my invention;

Fig. 5 is a part sectional, part perspective view of an alternative form of construction of a part of the apparatus illustrated in Fig. 1; and Fig. 6 is a diagrammatic representation of an alternative form of construction of a portion of my apparatus such as that illustrated in Fig. 1.

Broadly stated my invention comprises the provision of means for generating a scanning electron beam, a target arranged to be traversed or swept by said beam in its scansion, and means coordinated with the signal or data to be transmitted for producing a movable electron beam shadow on the target; deriving a signal which is a function of the impingement of the beam upon the target; and then transmitting such signal for reconstruction as a visual image at a remote point whereby a facsimile or reproduction of the electron beam shadow on the target aforesaid will be reproduced.

In the foregoing broad statement of my invention, I have used certain terms, such as "scanning electron beam"; "target"; and "movable electron beam shadow." It may be well, before proceeding with the description of my invention wherein these terms will be used repeatedly, to indicate the interpretation which I intend to be given to such terms whenever used in this description or in the appended claims.

By the term "a scanning electron beam," I intend to generically include any electron beam or the like which is caused to traverse in any way the target toward which it is directed. Where in this description reference is made to the fact that the beam scans the target, it is, therefore, meant that the beam sweeps over the target in whatever direction or path may be desired for a particular installation. Thus the beam, in sweeping over the target, may sweep thereover only once or a plurality of times; and the line of intersection between the beam and the plane of the target may be a straight line, a circle, or any modifications of the same, it being within the contemplation of my invention to use any of these expedients.

Where the word "target" is used in this description is meant the provision of any member whether conductive or non-conductive, but which is so positioned with respect to the electron beam that the latter impinges thereon during at least a portion of the period of oscillation of the beam.

Throughout the following description and in the claims, I shall also frequently use the term "movable electron beam shadow," and by this term I intend to generically include all cases where the placing of any beam intercepting means in the path of the beam prevents the latter from impinging upon the target during any portion of the path of travel of the beam. Thus, for example, if the beam is arranged to oscillate so as to closely scan by following parallel lines a rectangular area and a spherical object is placed in the path of the beam in front of the rectangular area or target, such object, in accordance with my invention, would cast a circular beam shadow on the target even though such spherical intercepting means only intercepts the beam periodically during the scansion of the latter over the target.

By use of the term "movable" in modifying the definition of "electron beam shadow" as above defined, it is intended to mean that the electron beam intercepting means is movable in such a way that the total electron beam shadow cast thereby is movable with respect to the target upon which such electron beam shadow falls. Stated in another way, the provision of means for producing a movable electron beam shadow on the target comprises means for selectively shielding different portions of the target from impingement by said beam.

Referring now more specifically to the drawing, and more especially to Fig. 1, the cathode ray tube here illustrated as embodying one representation of the principles of my invention is generally indicated by the reference character 1. In Fig. 1, that portion of the cathode ray tube 1 embraced by the bracket associated with the reference character 2, is conventional, and forms no part of this invention. The part 2 of the tube comprises the conventional cathode ray gun with means for varying in a prescribed manner the axis of the ray with respect to the axis of the gun, so that such ray in its oscillation will sweep over or scan a target which may be positioned in the right-hand end of the tube.

The envelope of the tube generally indicated at 3 terminates in a substantially flat base 4 adjacent which is mounted in any suitable fashion the special target which characterizes one feature of my invention.

As previously indicated, the present invention is concerned with the problem of transmitting to a remote station data indicative of the position, for example, of a cursor associated with a conventional instrument such as a pressure gauge, air speed indicator, altimeter, or the like. In Fig. 3, the base 4 of the tube envelope 3 is shown in dotted lines. In full lines is shown an instrument panel on the face of which are mounted the dials and movable cursors of the instruments associated with the respective dials. Throughout the following description of my invention, it will be assumed that the apparatus illustrated, for example, is designed to transmit to a remote station an indication of the relative positions of the several cursors with respect to their respective dials.

The instrument panel generally indicated at 5 has the several instruments 6 mounted thereon with the shafts 7 carrying the cursors extended so that when the panel 5 and envelope 3 are mounted in assembled relation by clamps such as 8, the cursors 9 will lie closely adjacent to the outer surface or face of the base 4 of the envelope.

Rigidly supported in the base of the envelope, and preferably parallel to the base face 4, are spaced plates 10 and 11. These plates will be anchored to the envelope in any suitable manner so as to be maintained rigid with respect thereto, and with respect to each other. The plate 10 is provided with bearings 12 which rotatably support spindles 13. The spindles 13 have fixed thereto, at opposite ends, bars 14 and 15, the latter being made to correspond for convenience in shape and general configuration to a conventional cursor such as might be employed in conjunction with the instrument 6.

One of the elements 9 or 14 or both are permanent bar magnets. The fact that the spindles 13 are mounted for free rotation in the bearings 12 will cause the bar 14 to, at all times, overlie the bar 9 in parallel relationship.

Suitable leads such as 16 and 17 are connected with the plates 10 and 11 and carried through the envelope 3 in appropriate sealed connections.

In Fig. 4, I have illustrated diagrammatically the circuit previously explained. The electron gun is denoted by the reference character 2, and is capable of producing scanning electron beam adapted to sweep over or scan the target plate 11. The bar 15 is shown fixed to the spindle 13 and the latter is shown connected directly to the lead 16 instead of through the plate 10 through which such connection is made in the actual construction illustrated in Figs. 1 and 2. A conventional transformer 18, such as would be used in a television circuit and a conventional television transmitter, is diagrammatically illustrated at 19.

From the foregoing, it will be observed that as the spindle 7 of the instrument 6 rotates, the cursor 15 will be maintained in synchronism therewith. As the electron beam generated by the gun 2 traverses or scans the target 11, the cursor 15 will intercept the electron beam or more accurately cast an electron beam shadow on the target 11, and the signal derived and transmitted to the remote station will, when reconstructed in accordance with conventional television practice, show the relative position of the cursor 15 with respect to the target.

Fig. 5 shows a slight modification of the arrangement illustrated in the previous figures, in that the target 11a is provided with a plurality of indicia which may be either apertures or non-conductive areas so that the facsimile of the target when reproduced at the receiving station will have such indicia thereon to facilitate interpetration of the position of the cursor with respect to such indicia as represented by the electron beam shadow of the cursor on the target.

In Fig. 6 I have illustrated a signal generating cathode ray tube embodying a modification of my invention as previously explained. In this modification, a conventional cathode ray gun 2a is employed. The base 4a of the envelope, or more particularly the target 11b, is curved so that a small sphere 20 (of suitable material as known in the electronic art), when permitted to rest thereon by gravity, and when the axis of the envelope 3a is tipped back and forth, the sphere will roll back and forth on the target 11b.

In this case, the sphere 20 functions as the cursor or as the means for providing the movable electron beam shadow on the target, and the signal derived from the target and transmitted will, therefore, show on the reproduction thereof at the remote station the relative position of the sphere 20 with respect to the target. It will be immediately apparent that the device in Fig. 6 may be utilized as a turn and bank indicator, for aircraft.

The foregoing is obviously only one embodiment of the principles of my invention, the illustrated embodiment being particularly suitable for use in connection with remotely controlled aircraft where it is desired to indicate at the ground station the condition of the instruments in the remotely controlled craft. It will be apparent to those skilled in the art, however, that the fundamental expedient characterizing the present invention, namely the provision of means for casting a movable electron beam shadow on the target, may be utilized for a variety of purposes which it is believed unnecessary to specifically refer to at this point.

Other modes of applying the principle of my invention may be employed, change being made as regards the details described, provided the features stated in any of the following claims or the equivalent of such be employed.

I, therefore, particularly point out and distinctly claim as my invention:

1. In apparatus of the character described, the combination of means for generating an electron beam, a target in the path of said beam, a sealed envelope enclosing said means and target, and movable cursor means between said beam-generating means and said target to form a shadow on the target for reproduction of such cursor means image.

2. In apparatus of the character described, the combination of means for generating a scanning electron beam, a target arranged to be swept by said beam, a sealed envelope enclosing said means and target, and an element between said beam-generating means and said target movable by outside control to form an image-shadow for reproduction.

3. In apparatus of the character described, the combination of means for generating a scanning electron beam, a target arranged to be swept by said beam, a sealed envelope enclosing said means and target, a cursor enclosed in said envelope between the beam-generating means and the target for forming a reproducing image by casting a moving beam shadow on said target, and means including a magnetic element for moving said cursor.

4. In apparatus of the character described, the combination of means for generating a scanning electron beam, a target arranged to be swept by said beam, a sealed envelope enclosing said means and target, movable cursor means enclosed in said envelope between the beam-generating means and the target for forming a reproducing image by casting a moving beam shadow on said target, and means deriving a signal from the target indicating the position of the cursor means.

5. In apparatus of the character described, the combination of means for generating a scanning electron beam, a target arranged to be swept by said beam, a sealed envelope enclosing said means and target, a cursor enclosed in said envelope between the beam-generating means and the target for forming a reproducing image by casting a beam shadow on said target, means including a magnetic element for moving said cursor, and means deriving a signal from the target indicating the position of the cursor means.

6. In apparatus of the character described, the combination of means for generating a scanning electron beam, a target arranged to be swept by said beam, a sealed envelope enclosing said means and target, movable means enclosed by said envelope for forming a reproducing image of the movable means by its casting a selectively movable beam shadow on said target, and a cursor outside of said envelope linked with said movable means whereby the position of the latter is synchronized with the position of said cursor.

7. In apparatus of the character described, means for generating an electron beam, means for sweeping said beam back and forth in scanning movement, a target to be scanned by said beam, a sealed envelope enclosing said means and target, an indicating gauge on the outside of said envelope having a movable indicator element, a cursor on the inside of said envelope between the means for sweeping said electron beam and said target and being movable in unison with said gauge indicator element, and means deriving a signal from said target having a function indicative of the position of said first named cursor.

JOHN J. MOYNIHAN.